(12) United States Patent
Abileah

(10) Patent No.: US 7,307,675 B2
(45) Date of Patent: Dec. 11, 2007

(54) DISPLAY PANEL WITH BACKLIGHTING STRUCTURE AND SELECTIVELY TRANSMISSIVE WINDOW THERETHROUGH

(75) Inventor: Adiel Abileah, Portland, OR (US)

(73) Assignee: Planar Systems, Inc., Beaverton, OR (US)

( * ) Notice: Subject to any disclaimer, the term of this patent is extended or adjusted under 35 U.S.C. 154(b) by 356 days.

(21) Appl. No.: 11/007,074

(22) Filed: Dec. 7, 2004

(65) Prior Publication Data

US 2006/0119765 A1 Jun. 8, 2006

(51) Int. Cl.
*G02F 1/1335* (2006.01)
*G02F 1/1333* (2006.01)

(52) U.S. Cl. .................. 349/61; 349/114; 349/86

(58) Field of Classification Search .......... 349/61, 349/114, 86
See application file for complete search history.

(56) References Cited

U.S. PATENT DOCUMENTS

| | | | |
|---|---|---|---|
| 4,394,068 A | 7/1983 | Pape et al. .............. 350/345 |
| 5,041,965 A | 8/1991 | Chen ...................... 364/200 |
| 5,123,192 A | 6/1992 | Hsieh ..................... 40/442 |
| 5,281,957 A | 1/1994 | Schoolman ............. 345/8 |
| 5,416,617 A | 5/1995 | Loiseaux et al. ....... 359/51 |
| 5,742,262 A | 4/1998 | Tabata et al. ........... 345/8 |
| 5,892,598 A | 4/1999 | Asakawa et al. ....... 359/13 |
| 5,920,363 A | 7/1999 | Rofe ...................... 349/96 |
| 6,106,121 A | 8/2000 | Buckley et al. ......... 359/839 |
| 6,144,424 A | 11/2000 | Okuda et al. ........... 349/65 |
| 6,220,711 B1 | 4/2001 | Melville ................. 353/28 |
| 6,481,851 B1 | 11/2002 | McNelley et al. ..... 353/28 |
| 6,559,813 B1 | 5/2003 | DeLuca et al. ......... 345/8 |
| 6,588,909 B2 | 7/2003 | Yaniv et al. ............ 353/98 |
| 2004/0029636 A1 | 2/2004 | Wells ..................... 463/32 |
| 2004/0116178 A1 | 6/2004 | Okada .................... 463/20 |
| 2004/0189910 A1* | 9/2004 | Paukshto et al. ...... 349/123 |
| 2004/0209666 A1 | 10/2004 | Tashiro et al. ......... 463/20 |
| 2004/0209670 A1 | 10/2004 | Adachi et al. ......... 463/20 |
| 2004/0218115 A1* | 11/2004 | Kawana et al. ........ 349/71 |
| 2005/0259216 A1* | 11/2005 | Lin et al. ............... 349/196 |

OTHER PUBLICATIONS

Bonsor, K., "How Smart Windows Work" [online] [retrieved on Nov. 29, 2004]. Retrieved from the Internet: <URL: http://home.howstuffworks.com/smart-window.htm/printable>.

Vikuiti™ Display Enhancement, "Application Guidelines" [online], 2003.

PDLC Switchable Windows [online] [retrieved on Apr. 13, 2004]. Retrieved from the Internet: <URL: http://www.ici.kent.edu/switch.html>.

* cited by examiner

*Primary Examiner*—Mike Qi
(74) *Attorney, Agent, or Firm*—Stoel Rives LLP

(57) ABSTRACT

A backlighting structure for use with a display comprises a light source, an illumination area, a permanently reflecting material, and a selectively reflecting material. The illumination area is bounded by a back side, a front plane on a front side, and lateral sides. The permanently reflecting material lies along a first subset of the back side, and the selectively reflecting material lies on a second subset of the back side. The selectively transparent material can controllably change between a reflecting state and a non-reflecting (e.g., transmitting) state.

36 Claims, 3 Drawing Sheets

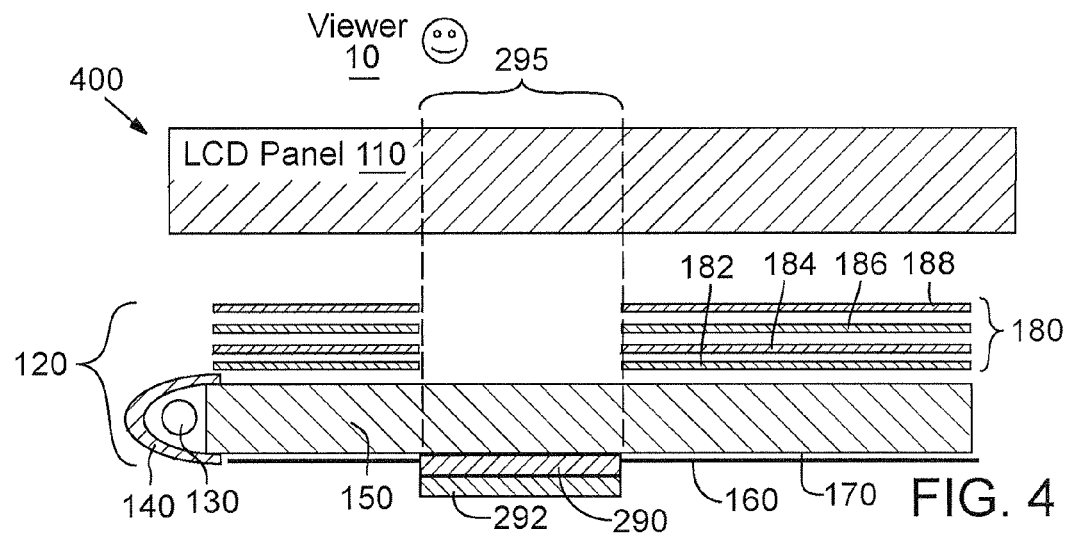
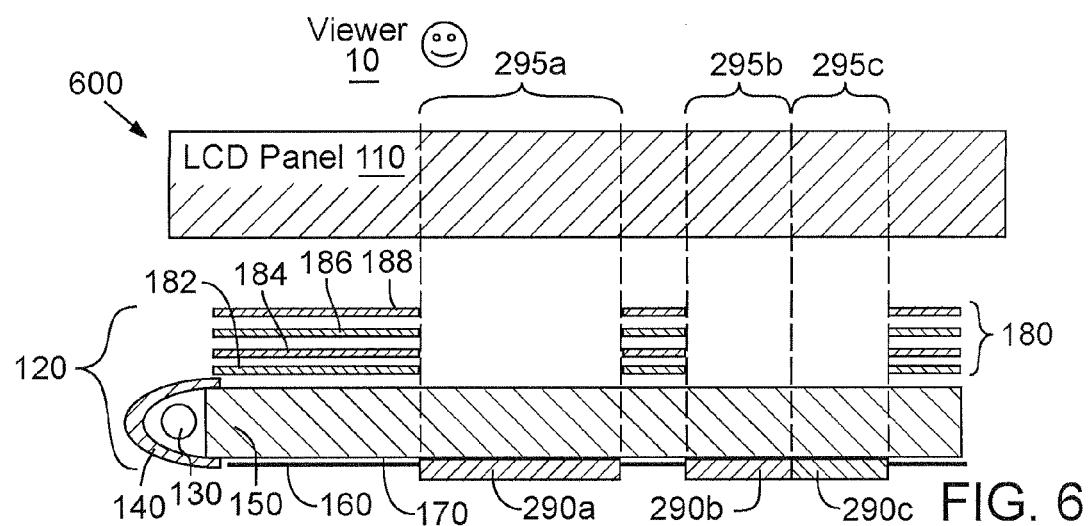
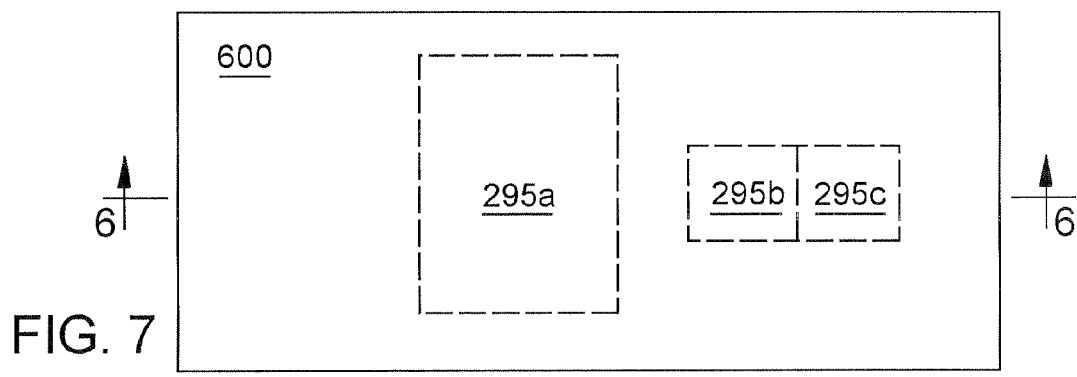

DISPLAY PANEL WITH BACKLIGHTING STRUCTURE AND SELECTIVELY TRANSMISSIVE WINDOW THERETHROUGH

TECHNICAL FIELD

The field of this disclosure relates generally to electronic displays, such as liquid crystal displays, and more particularly to displays that can be made transmissive or transparent.

BACKGROUND

A common type of electronic display is the liquid crystal display (LCD). A typical LCD-based display 100 is illustrated in FIG. 1. The display 100 includes an LCD panel 110 and a backlighting structure 120. The LCD panel comprises a grid of liquid crystal elements (or pixels), which transmit light of a specified color when electrically activated. To control the overall brightness of an image on an LCD panel it is often necessary to provide backlighting, as provided by the backlighting structure 120. The backlighting structure 120 includes a cold cathode fluorescent lamp (CCFL) 130 running along one or more side edges of the backlighting structure 120. The CCFL 130 emits light energy into an illumination area behind the LCD panel. A lamp reflector 140 reflects the light energy toward the illumination area, in which a light guide 150 is placed. On the back side of the illumination area is a permanently reflecting material 160 having a reflecting pattern 170. The permanently reflecting material 160 reflects the light energy in the illumination area toward the back side of the LCD panel 110 and thereby provides backlighting to improve the visibility of the LCD panel 110. Positioned between the LCD panel 110 and the light guide 150 are several layers of diffusers 180, including a first plastic diffuser 182, a brightness enhancement film (BEF) sheet 184, a second plastic diffuser 186, and a DBEF (double BEF) sheet 188. The diffusers 180 act to diffuse the light energy in the light guide 150 and distribute it more evenly across the back side of the LCD panel 110 both spatially and angularly.

An LCD element can be made transmissive by applying an appropriate electrical voltage across it. In that way, it is possible to make some or all of the LCD panel 110 transmissive so that a viewer 10 can see through the LCD panel 110, revealing the backlighting structure 120, which is typically illuminated with white light. However, many backlighting structures 120 are neither transmissive nor transparent. When the backlighting structure 120 is non-transmissive or non-transparent, a viewer 10 cannot see an object 20 behind the backlighting structure 120.

SUMMARY

The present invention provides improved transmissivity through a display having a backlighting structure.

According to one embodiment, a display has a backlighting structure behind an LCD panel. The backlighting structure comprises a light source and has opposing front and back sides, wherein the front side of the backlighting structure faces the LCD panel. The display further comprises a permanently reflecting material along a first interior portion of the back side of the backlighting structure, wherein the permanently reflecting material is oriented to reflect light from the light source toward the LCD panel. The display further comprises a selectively transparent material along a second interior portion of the back side of the backlighting structure, wherein the selectively transparent material is capable of being selectively and reversibly made either transparent or reflecting.

According to another embodiment, a backlighting structure for use with a display comprises a light source, an illumination area, a permanently reflecting material, and a selectively reflecting material. The illumination area is bounded by a back side, a front side, and lateral sides. The permanently reflecting material lies along the front side of a first subset of the back side, and the selectively reflecting material lies on a second subset of the back side. The selectively reflecting material can controllably change between a reflecting state and a non-reflecting state.

According to another embodiment, a backlit display has a controllably transmissive window therethrough. The display comprises a display panel and a backlighting structure. A portion of the display panel can be made transmissive by electrical control. The display panel has a viewing side and an opposing back side. The backlighting structure is positioned behind the back side of the display panel. The backlighting structure comprises a rear reflector oriented to reflect light toward the back side of the display panel. The rear reflector comprises a permanently reflecting material and a selectively transmissive material that can change state from a transmissive state to a non-transmissive state by electrical control. The selectively transmissive material is positioned to underlie the portion of the display panel that can be made transmissive by electrical control.

According to another embodiment, an apparatus for use by a user comprises a means for electronically displaying to the user an image on a first portion of a display having a front viewing side and a back side, a means for selectively making transmissive a second portion of the display, a means for providing light on the back side of the display, a means for permanently reflecting the light toward the back side of the display from a first area underlying the first portion of the display; and, in a second area underlying the second portion of the display, a means for either reflecting the light toward the back side of the display from the second area or selectively transmitting light through the second area and thereby revealing to the user an object behind the second area.

The term "transparent" is used herein in all of the senses it is understood in the art, including the sense of being highly transmissive, and the term "transmissive" means having the property of transmitting light to some degree, from a noticeable level, up to and including a level that would also be considered transparent.

Details concerning the construction and operation of particular embodiments are set forth in the following sections.

BRIEF DESCRIPTION OF THE DRAWINGS

FIGS. 2, 4, and 6 are exploded cross-section views of displays according to various embodiments.

FIG. 7 is a front view of the display of FIG. 6.

DETAILED DESCRIPTION OF EMBODIMENTS

With reference to the above-listed drawings, this section describes particular embodiments and their detailed construction and operation. As one skilled in the art will appreciate, certain embodiments may be capable of achieving certain advantages over the known prior art, including some or all of the following: (1) the ability to retain the advantages of backlighting while providing transparency through the backlighting structure; (2) the ability to selectively reveal to a viewer of a display an object behind the display's backlighting structure; (3) the ability to combine both an electronically generated image and a real object for viewing within a window of the electronically generated image; and (4) the ability to combine two distinct electronic displays in a windowed arrangement. These and other advantages of various embodiments will be apparent upon reading the following.

Figure 1:
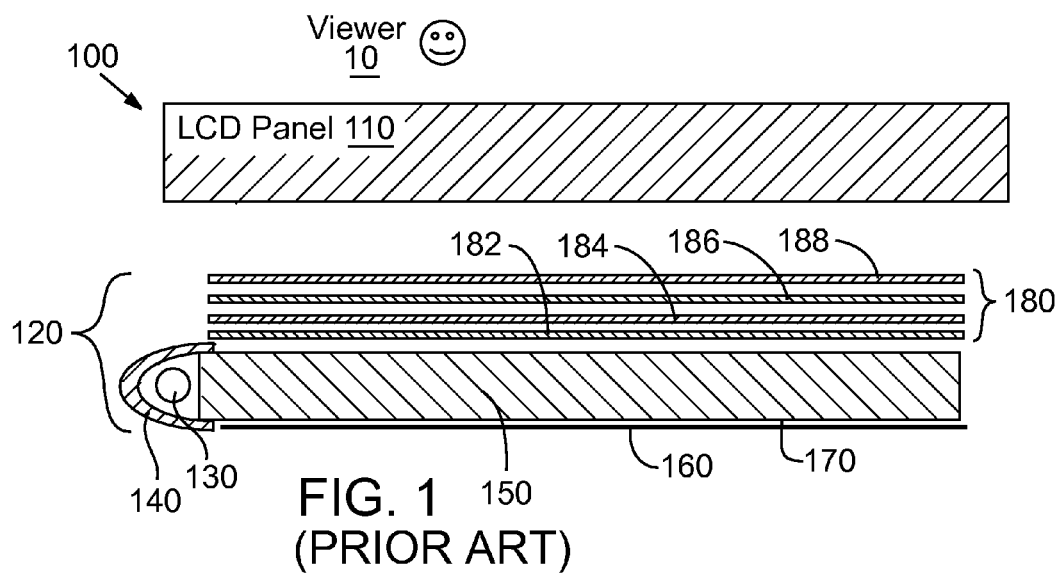
FIG. 1 is an exploded cross-section view of a display.
Figure 2:
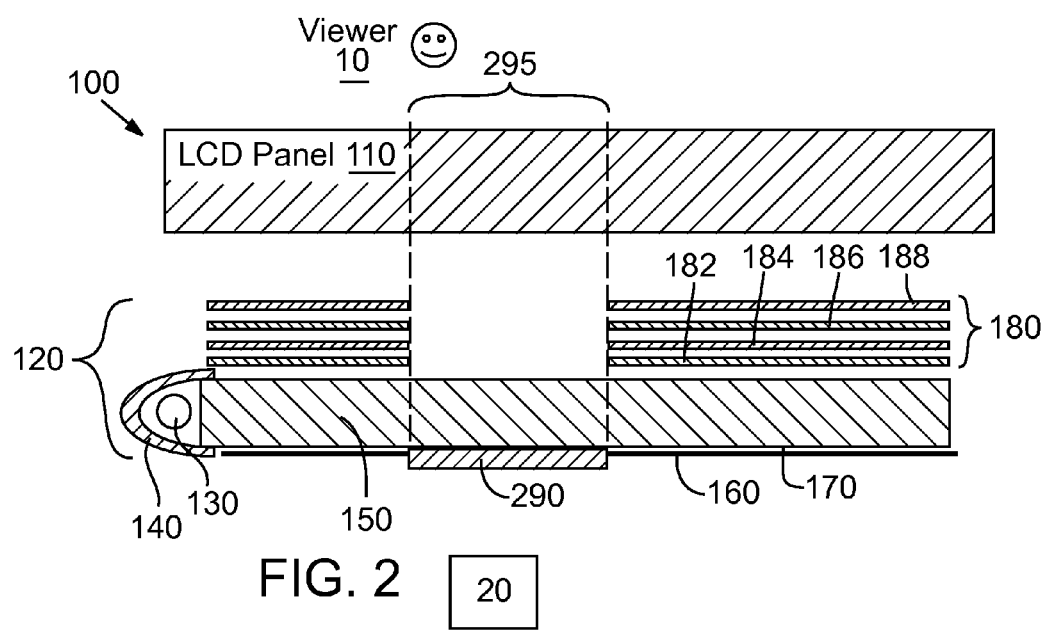

FIG. 2 is an exploded cross-section view of a display 200 according to one embodiment. The display 200 is the same as the display 100 (FIG. 1) except for a difference in the backlighting structure 220, which differs from the backlighting structure 120 in two ways. First, the diffusers 180 are not present in a predetermined area. Second, the reflecting material 160 with its reflecting pattern 170 has been replaced with a polymer dispersed liquid crystal (PDLC) cell 290 underlying the same area. The PDLC cell 290 can be electrically driven into a transparent mode, when desired, and returned to a non-transparent, scattering or diffusing mode by removing the electrical drive signal. As a result of those modifications, the display 200 has a predetermined portion, area, or window 295 that can be made transparent completely therethrough, so as to reveal to the viewer an object 20 behind the PDLC cell 290. Such transparency can be accomplished by driving the corresponding elements of the LCD panel 110 into a transmissive state and by simultaneously driving the PDLC cell 290 into a transparent state. For example, when the window 295 is activated for viewing therethrough, the transmissivity of white light of the corresponding portion of the LCD panel 110 is typically about 3%-7% if it is a color LCD panel and may be as high as about 30% if it is a black and white LCD panel, while the transmissivity of the PDLC cell 290 is about 90%-92%. Those figures can be different, depending upon the particular materials and devices employed and the conditions under which they are utilized.

The display 200 can be modified in a number of ways. In place of the LCD panel 110 any display panel that can be selectively made transmissive or even transparent in whole or in part can be used in the display 200. Examples of suitable LCD types include twisted nematic (TN), in-plane switching (IPS), electrically controlled birefringence (ECB), pi-cell, and multi-domain vertical alignment (MVA). In place of the CCFL 130 any light source can be used, whether active (e.g., one or more LEDs (light emitting diodes)) or passive (e.g., a light pipe extending externally from the display 200). As shown, the CCFL 130 provides illumination from one side edge of the illumination area (where the light guide 150 is). Multiple light sources can be positioned along multiple sides of the illumination area, if desired. The lamp reflector 140 is optional though advantageous in that it directs light toward the illumination area, where the light is useful for backlighting, and prevents leakage of light away from the illumination area. The light guide 150 is optional but advantageous as a means to uniformly distribute the light from the CCFL 130 along the entire extent of the display panel 110. The light guide 150 may be a transparent plastic, such as polycarbonate or PET (polyethylene terephthalate). The reflecting material 160 is preferably a plastic painted or colored to be reflective. Alternatively, the reflective material 160 can be a metal or any other material with suitable reflectivity. The reflecting pattern 170 is preferably a surface characteristic of the reflecting material 160, such as patterned reflective or translucent dots, which may be formed by screen printing, or bumps, which may be formed by etching. Preferably there is a higher density of dots, bumps, or the like as the distance from the CCFL 130 increases, so as to create more uniform illumination of the display panel 110 by reflective scattering.

The diffusers 180 are optional in the display 200. When present, they can aid in distributing the light energy more evenly across their surfaces. However, in some cases, the diffusers 180 can cause unequal illumination in areas where they are present compared to the area where they are absent. In such cases, omissions of the diffusers 180 entirely can help equalize the illumination of the selectively transparent portion compared to the remainder of the display area. In FIG. 2, four separate diffuser layers 182-188 are shown. A lesser or greater number of layers can be utilized. Alternatively, the diffusers 180 need not be removed over the predetermined selectively transparent window 295. In particular, a mild diffuser (not shown) can be placed under the entire display area, including the window 295. When a diffuser covers the window 295, it preferably should cause low scattering or diffusion, so that the view through the window 295 is not significantly distorted. In other words, the mild diffuser preferably causes diffusion that is minimal and still allows proper viewing through the window 295.

The PDLC (polymer dispersed liquid crystal) cell 290 is a device containing a selectively transparent material. The PDLC cell 290 acts like an electronically controllable shutter or light valve. It has two basic states: a transparent state and a diffusive reflective state. PDLC is a material consisting of liquid crystal droplets in a polymer mixture. When PDLC is sandwiched between two pieces of transparent conductive electrodes coated on substrates (glass or plastic), its optical properties can be modified by application of a voltage to the electrodes. In its nominal state, the liquid crystal droplets are oriented in random directions, causing them to scatter incident light (i.e., to act like a diffusive reflector). However, when a voltage is applied to the electrodes, an electric field is generated through the polymer, causing the liquid crystal droplets to align in a parallel direction, in which case, the PDLC becomes transparent. A PDLC cell is a combination of PDLC material sandwiched between the substrates (glass or plastic) coated with transparent conductive electrodes. PDLC cells are available commercially from, for example, Polytronix, Inc. of Richardson, Tex., and Xymox Technologies, Inc. of Milwaukee, Wis.

Figure 3:
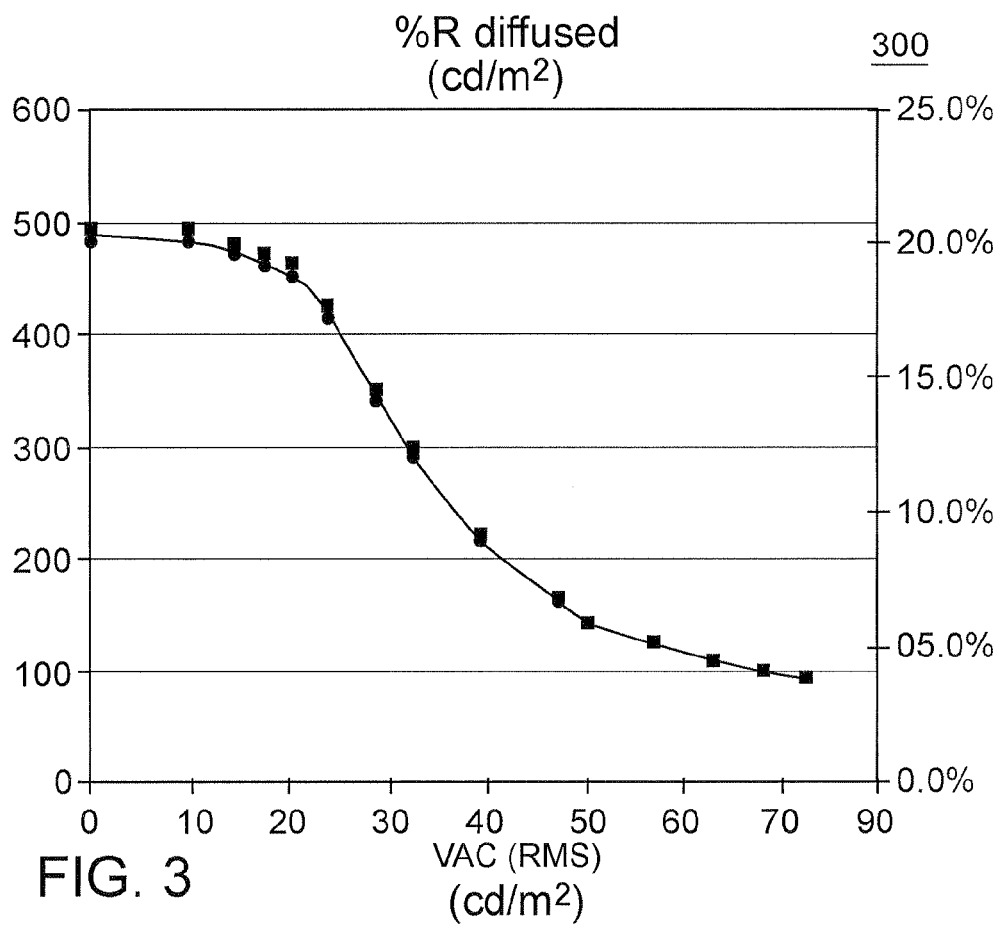
FIG. 3 is a plot of a performance characteristic of the PDLC cell of the displays of FIG. 2.

FIG. 3 is a plot 300 of diffusive reflectivity of a sample PDLC cell versus applied voltage. The particular sample used to generate the plot 300 was a six by six inch square PDLC cell from Polytronix, Inc. The horizontal axis is AC (alternating current) RMS (root mean square) voltage applied through the PDLC cell, measured in volts, and the vertical axes are diffused reflectivity in units of candellas per square meter. The right side axis is normalized relative to a standard reflector (in percent), and the left side axis is unnormalized. The plot 300 shows that when no voltage is applied through the PDLC, its diffusive reflectivity is relatively high (about 21%), but as the applied voltage increases, the diffusive reflectivity decreases to less than 5%, indicating that the PDLC becomes transparent.

The PDLC cell 290 is preferably attached to the light guide 150 by means of an adhesive, such as a pressure sensitive adhesive (PSA). Any transparent adhesive is suitable for use with the display 200. Preferably the index of refraction of the PSA is similar to the glass or plastic substrate of the PDLC cell and also similar to the light guide to maximize transmission.

Optionally, a second selectively transparent material or device, such as a PDLC cell 292, can be placed behind the PDLC cell 290, as shown in the display 400 illustrated in FIG. 4. The second selectively transparent material or device may be another PDLC cell, such as the PDLC 292, or an electro-chromic material that is electronically switchable from a transparent state to a reflective state. The second selectively transparent material can be selected based on its reflective properties. For example, the second PDLC is reflective-diffusive in its reflective state, whereas an electrochromic is like a mirror reflector in its reflective state. The second selectively transparent material can improve overall reflectivity in the window 295. There is preferably a small air gap between the first and second selectively transparent materials.

Figure 5:
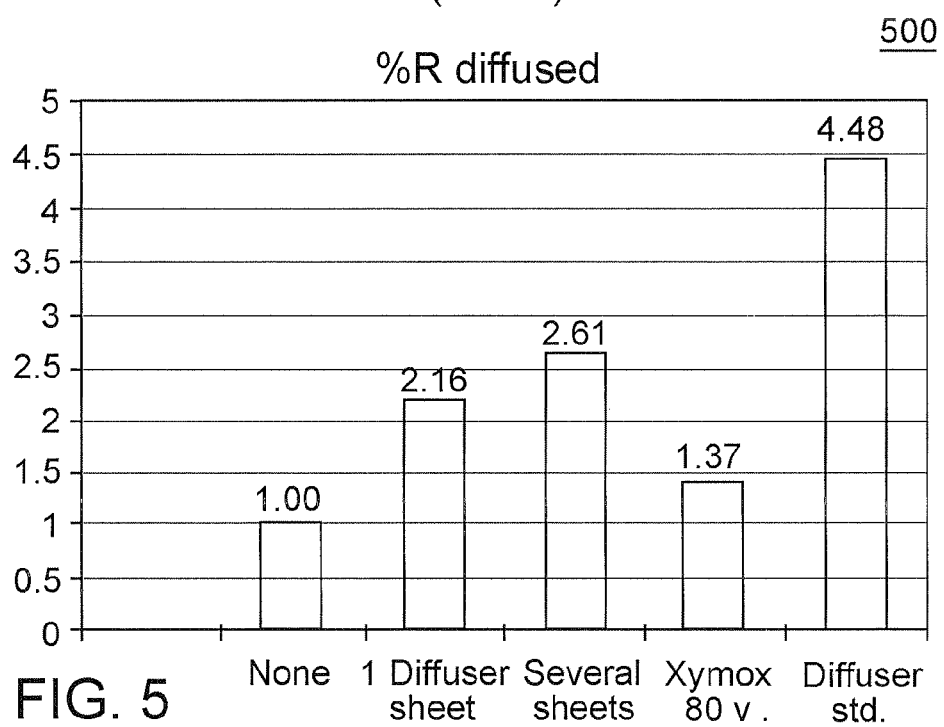
FIG. 5 is a bar graph of a performance characteristic of the PDLC cell of the display of FIG. 4.

FIG. 5 is a bar graph 500 of diffusive reflectivity of a sample PDLC cell (with zero voltage applied to it) with various underlying materials. The first (left) bar shows the reference baseline in the case in which no material is behind the sample PDLC cell. The other bars show that overall diffusive reflectivity increases when various other materials are placed behind the PDLC cell. For example, a single diffuser sheet increases overall diffusive reflectivity 116%, while multiple diffuser sheets cause a 161% increase. Another PDLC cell, in particular a Xymox 80 PDLC cell (also with zero voltage applied to it) causes a 37% increase in diffusive reflectivity. Thus, two laminated layers of PDLCs provide improved diffusive reflectivity and thus better brightness in the window area of the display during non-transparent times. The bar on the right represents a standard Lambertian diffuse reflective material.

Overall diffusive reflectivity can be further increased by sandwiching more than two layers of selectively diffusive reflective materials, as desired. However, each additional layer has an increasingly diminishing effect on overall reflectivity. Moreover, additional layers typically cause a decrease in the overall transmissivity of the structure in the window 295. The overall transmissivity of the structure, whether it be formed of multiple layers or a single layer, should be sufficient in its transmissive state to suit the application.

Other selectively reflecting, transmissive, or transparent materials besides PDLC can be used in place of the PDLC cell 290. Examples of such other materials include suspended particle materials, electrochromic windows, reflective hydrides, photocromic or photochromatic, and thermotropic materials. While such material is preferably highly transmissive (e.g., transparent) in its non-reflecting state, even a low transmissivity or transmittance may be acceptable is some applications.

The window 295 typically has a predetermined size, shape, and placement. Preferably, the window 295 has a rectangular shape, though practically any shape is possible. Although a single window 295 is illustrated in FIGS. 2 and 4, multiple windows can be included, wherein each window is independently controllable. An example of a multiple-window display 600 is illustrated in FIGS. 6 and 7, in which first, second, and third PDLC cells 290a, 290b, and 290c correspond to first, second, and third windows 295a, 295b, and 295c, respectively. Multiple windows may be disjoint (e.g., window 295a), adjoining (e.g., windows 295b and 295c), or even overlapping. In the case of adjoining windows, by making different windows transmissive/transparent at different times, the shape of the overall window can be effectively varied. Alternatively, one or more windows can encompass the entire two-dimensional area of the LCD panel 110, effectively making the entire display 400 selectively transparent.

The displays 200, 400, and 600 can be utilized in a variety of applications, including, for example, gaming machines (e.g., arcade machines or slot machines), automobile dashboards, instrument displays, equipment gauges, and combining maps and other information, depending upon the number of windows 295, their shape(s), and the nature of the object(s) behind the windows. The object(s) 20 may be static or dynamic, electronic or non-electronic. For example, the object 20 may be another electronic display. As another example, the displays 200, 400, or 600 may be part of a slot machine, in which one or more windows can selectively reveal one or more rotatable wheels behind the backlighting structure 220, while the LCD panel 110 can electronically display information related to the slot machine game in non-window areas and/or the window areas. The LCD panel 110 may include a touch screen. In measurement equipment or an automobile dashboard, as another instance, a gauge, meter, analog readout, or the like can be selectively revealed behind a display such as the displays 200-400 in such a way that the electronically displayed information can be selectively combined with the underlying object. Moreover, the displays 200, 400, and 600 can be used in a "screen saver" mode, in which a print object is placed behind the window area(s), which can be "opened" to reveal the print object during times when the LCD panel 110 is not being used to display electronic images.

The terms and descriptions used herein are set forth by way of illustration only and are not meant as limitations. Those skilled in the art will recognize that many variations can be made to the details of the above-described embodiments without departing from the underlying principles of the invention. The scope of the invention should therefore be determined only by the following claims, and their equivalents, in which all terms are to be understood in their broadest reasonable sense unless otherwise indicated.

The invention claimed is:

1. In a display having a backlighting structure behind an LCD panel, the backlighting structure comprising a light source and having opposing front and back sides, the front side of the backlighting structure facing the LCD panel, an improvement comprising:
   a permanently reflecting material along a first interior portion of the back side of the backlighting structure, the permanently reflecting material oriented to reflect light from the light source toward the LCD panel; and
   a selectively transparent material along a second interior portion of the back side of the backlighting structure, the selectively transparent material capable of being selectively and reversibly made either transparent or reflecting.

2. A display according to claim 1, wherein the selectively transparent material is part of a PDLC cell.

3. A display according to claim 1, wherein said second interior portion has a rectangular shape.

4. A display according to claim 1, further comprising a diffuser positioned between the LCD panel and the backlighting structure, wherein the diffuser is not present in an area overlaying said second interior portion.

5. A display according to claim 4, wherein the diffuser comprises multiple layers.

6. A display according to claim 1, wherein the backlighting structure comprises:
   a light source; and
   a light guide positioned to receive light from the light source.

7. A display according to claim 6, wherein the light source comprises a reflector lamp oriented to reflect light from the light source into the light guide.

8. A display according to claim 6, wherein the light source comprises a CCFL.

9. A display according to claim 1, wherein the permanently reflecting material is diffusively reflective, and the selectively transparent material is selectively diffusively reflective.

10. A display according to claim 1, wherein the improvement further comprises a selectively reflecting material positioned behind the selectively transparent material.

11. A display according to claim 10, wherein the selectively reflecting material is selectively diffusively reflective.

12. A display according to claim 10, wherein the selectively reflecting material is selectively non-diffusively reflective.

13. A backlighting structure for use with a display, the backlighting structure comprising:
   a light source;
   an illumination area bounded by a back side, a front side, and lateral sides;
   a permanently reflecting material along a first subset of the back side; and
   a selectively reflecting material on a second subset of the back side, wherein the selectively reflecting material can controllably change between a reflecting state and a non-reflecting state.

14. A backlighting structure according to claim 13, further comprising:
   a diffuser along the front side of the illumination area.

15. A backlighting structure according to claim 13, wherein the light source is positioned along at least one lateral side of the illumination area.

16. A backlighting structure according to claim 13, further comprising:
   a light guide in the illumination area.

17. A backlighting structure according to claim 13, wherein the permanently reflecting material has a textured surface so as to cause diffusive reflection.

18. A backlighting structure according to claim 13, wherein the reflecting state of the selectively reflecting material is a diffusively reflective state.

19. A backlighting structure according to claim 13, wherein the selectively reflecting material comprises a laminated stack of selectively reflecting materials.

20. A backlighting structure according to claim 13, wherein the non-reflecting state of the selectively reflecting material is a transparent state.

21. A backlighting structure according to claim 20, wherein the selectively reflecting material is part of a PDLC cell.

22. A display having a controllably transmissive window therethrough, the display comprising:
   a display panel, a portion of which can be made transmissive by electrical control, the display panel having a viewing side and an opposing back side; and
   a backlighting structure positioned behind the back side of the display panel, the backlighting structure comprising a rear reflector oriented to reflect light toward the back side of the display panel, the rear reflector comprising:
   a permanently reflecting material; and
   a selectively transmissive material that can controllably change state from a transmissive state to a non-transmissive state by electrical control, at least a portion of the selectively transmissive material positioned to underlie the portion of the display panel that can be made transmissive by electrical control.

23. A display according to claim 22, wherein the selectively transmissive material is selectively transparent.

24. A display according to claim 23, wherein the selectively transparent material is a part of a PDLC cell.

25. A display according to claim 22, further comprising a diffuser positioned between the LCD panel and the backlighting structure, wherein the diffuser is not present in an area overlaying the selectively transmissive material.

26. A display according to claim 25, wherein the diffuser comprises multiple layers.

27. A display according to claim 22, wherein the backlighting structure comprises:
   a light source; and
   a light guide positioned to receive light from the light source.

28. A display according to claim 22, wherein the permanently reflecting material is diffusively reflective, and the selectively transmissive material is diffusively reflective in its non-transmissive state.

29. A display according to claim 22, further comprising:
   a selectively reflecting material positioned behind the selectively transmissive material.

30. A display according to claim 29, wherein the selectively reflective material is selectively diffusively reflective.

31. A display according to claim 29, wherein the selectively reflective material is selectively non-diffusively reflective.

32. An apparatus comprising:
   a means for electronically displaying to a user an image on at least a first portion of a display having a front viewing side and a back side;
   a means for selectively making transmissive a second portion of the display;
   a means for providing light along the back side of the display;
   a means for permanently reflecting the light toward the back side of the display from a first area underlying the first portion of the display; and
   in a second area underlying the second portion of the display, a means for selectively either reflecting light toward the back side of the display from the second area or transmitting light through the second area and thereby revealing to the user an object behind the second area.

33. An apparatus according to claim 32, wherein the object is part of a slot machine wheel.

34. An apparatus according to claim 32, wherein the object is a gauge.

35. An apparatus according to claim 32, wherein the apparatus is part of an automobile dashboard.

36. An apparatus according to claim 32, wherein the object is an electronic display.

* * * * *